May 30, 1967  L. TROY  3,322,239
METHOD AND SYSTEM FOR ADJUSTING VEHICLE BRAKES
Filed Sept. 7, 1965  3 Sheets-Sheet 1

INVENTOR
LEONARD TROY

BY
ATTORNEY

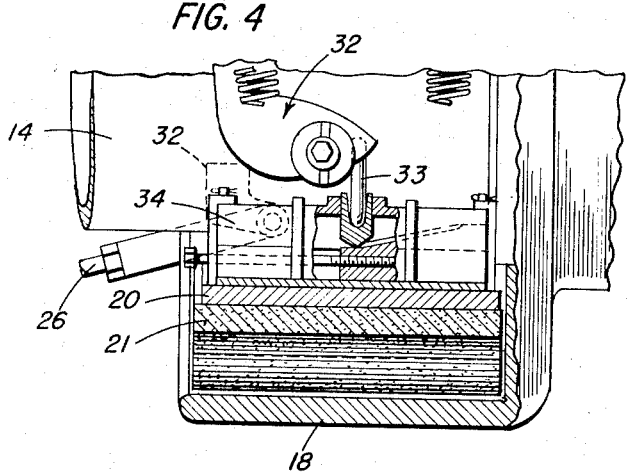
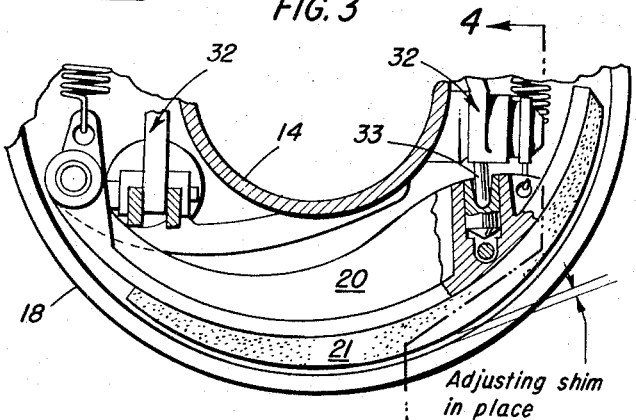
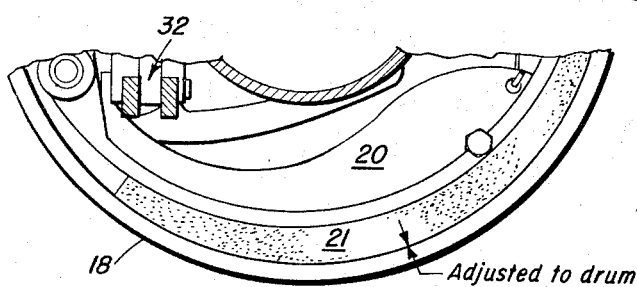
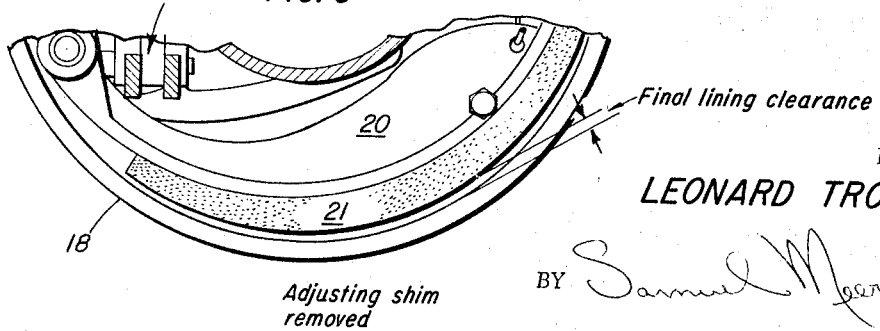

May 30, 1967  L. TROY  3,322,239
METHOD AND SYSTEM FOR ADJUSTING VEHICLE BRAKES
Filed Sept. 7, 1965  3 Sheets-Sheet 3
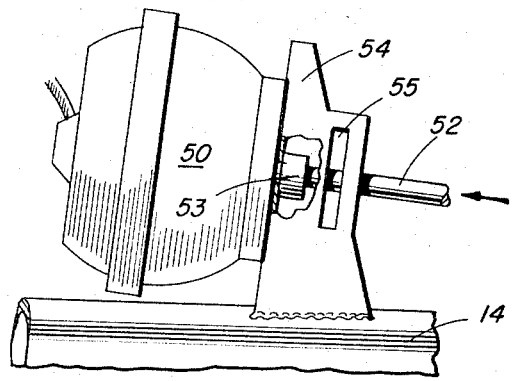
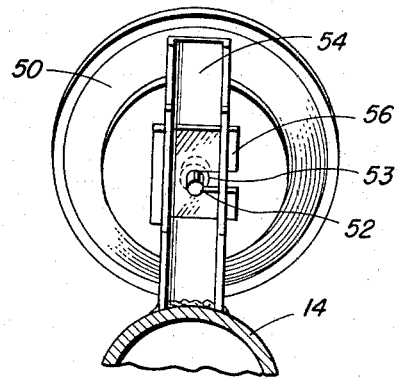
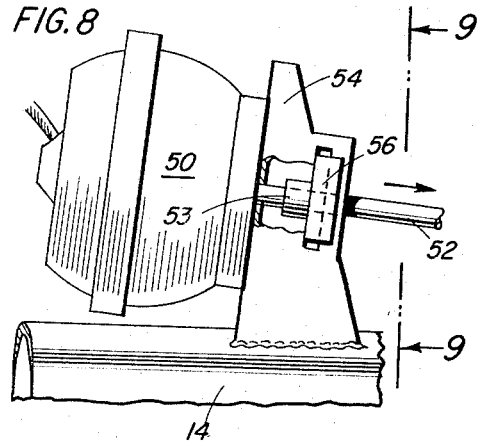
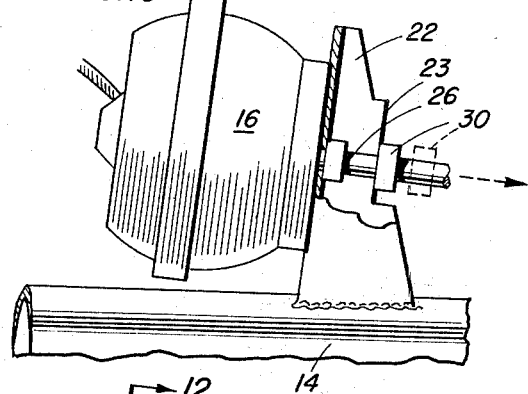
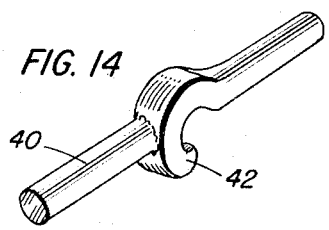
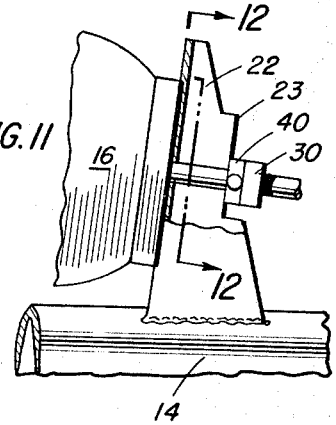
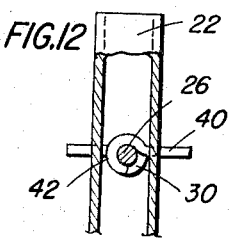
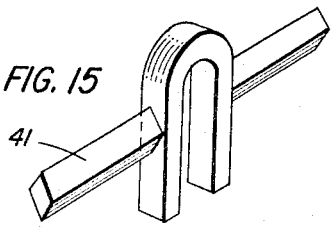
INVENTOR
LEONARD TROY
BY
ATTORNEY ns and more 
United States Patent Office 3,322,239
Patented May 30, 1967

3,322,239
METHOD AND SYSTEM FOR ADJUSTING VEHICLE BRAKES
Leonard Troy, 611 N. Webster Ave.,
Scranton, Pa. 18510
Filed Sept. 7, 1965, Ser. No. 485,187
5 Claims. (Cl. 188—79.5)

This invention relates in general to new and useful improvements in vehicle brake adjusting means and more particularly to a novel method and means for adjusting the clearance of vehicle brake shoe linings which embodies a positively consistent method of equalizing the brake shoe lining clearance on brakes, generally the types usually associated with all vehicles, particularly, trucks, truck trailers, trailers, semi-trailers, buses and like vehicles.

The conventional system of adjusting brakes consists of either adjusting the brakes in such a manner as to bring the linings firmly against the drum surface of the wheel and then backing off the shoe and linings thereon an approximate distance to set the clearance, or by jacking up the vehicle so that the wheel clears the ground and adjusting the brake shoes to attain the desired amount of drag upon the brake drum and allowing the lining to drag until it wears itself clear. These methods of adjusting or equalizing the brake shoe lining clearance in no way guarantee the simultaneous or equalized contact of all the linings to their respective drums but conversely generally subject the vehicle to uneven braking, erratic shifting of braking torque centers, etc., thus resulting in possible loss of control of the vehicle in addition to the added stresses and strains introduced into the vehicle structure itself and uneven wear on the brake lining.

It is therefore a primary object of this invention to set forth a novel method of adjusting the brake shoe lining clearance to positively assure equalization of the individual brake shoes in a given braking system.

It is another object of this invention to provide a system necessary to assure accurate adjustment of the brake shoe lining clearance by providing an adjustment gauging means which is used externally of the brake mechanism housing thus greatly simplifying the accurate adjustment of the respective brake lining clearance from the brake drum surface by means of a single physical adjustment and substantially eliminating human error that may occur.

Still another object of this invention is to set forth a method and means of accurately adjusting the clearance of brake shoe linings which is relatively simple and positive, thereby obviating the possibility of improperly adjusting the brake shoe clearance.

Still another object of this invention is to provide a novel system utilizing a brake-shoe-lining-clearance gauge or shim which facilitates accurately setting the brake shoe clearance.

Still a further object of this invention is to provide a method and system for adjusting each and every brake shoe in the system equally regardless of the variation in lining wear between the various brake linings.

With the above and other objects in view that will hereinafter appear, the nature of the invention will be more clearly understood by reference to the following detailed description, the appended claims and the several views illustrated in the accompanying drawings.

In the drawings:

FIGURE 3 is an enlarged fragmentary vertical sectional view taken along the line 3—3 of FIGURE 1 showing a portion of the internal construction of the vehicle wheel brake showing the brake shoes in a position prior to final adjustment, with a portion of the brake shoe broken away to show an internal adjusting means;

FIGURE 4 is a sectional view taken along the section line 4—4 of FIGURE 3, showing the details of a portion of one of the bellcranks and the internal brake adjusting means;

FIGURE 5 is an enlarged fragmentary vertical sectional view also taken along the line 3—3 of FIGURE 1, showing a portion of the internal construction of the vehicle wheel brake showing the brake shoes adjusted into contact with the inner periphery of the wheel drum;

FIGURE 6 is also an enlarged fragmentary vertical sectional view taken along the line 3—3 of FIGURE 1 showing a portion of the internal construction of the vehicle wheel brake with the brake shoes shown in the final adjusted position;

FIGURE 7 is an elevational view of a vacuum operated actuator incorporating one embodiment of the present invention, showing the actuator link and its integral collar in the brake on position;

FIGURE 8 is a front elevational view of the actuator of FIGURE 7 showing a brake clearance adjusting means preventing the movement of the brake shoes into the full applied position;

FIGURE 9 is an elevational view of the actuator of FIGURE 8 taken along the line 9—9 and showing the removable brake shoe clearance adjusting shim in place;

FIGURE 10 is an elevational view of a fluid pressure operated actuator and its mounting bracket, with portions of the mounting bracket broken away to show the actuator shaft in the off position;

FIGURE 11 is a fragmentary elevational view of the actuator of FIGURE 10 showing the actuator shaft being prevented from fully retracting to the off position by a brake shoe clearance adjusting shim;

FIGURE 12 is a fragmentary sectional view of the mounting bracket of FIGURE 11 taken along the line 12—12 of FIGURE 11 showing the brake shoe clearance adjusting shim in place on the actuator shaft;

FIGURE 14 is an enlarged perspective of the brake shoe clearance adjusting shim of FIGURES 11 and 12; and FIGURE 15 is a perspective view of another embodiment of a brake shoe clearance adjusting shim which may be used with an actuator such as shown in FIGURES 10 and 11.

Figure 1:
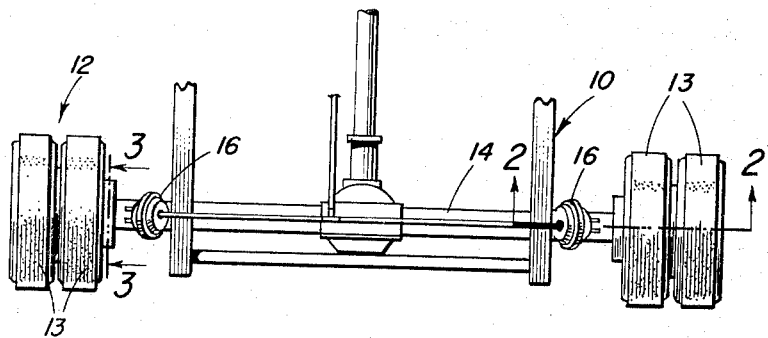
FIGURE 1 is a fragmentary top plan of a vehicle chassis and power train embodying the present invention.

Referring now to the drawings in detail, it will be seen that in FIGURE 1 there is illustrated a portion of a vehicle chassis and power train assembly indicated generally by the numeral 10. The vehicle chassis assembly 10 includes a dual wheel assembly indicated generally by the numeral 12. The vehicle wheel assembly 12 includes an axle housing 14 to which is connected a plurality of brake actuators 16, one actuator being provided with each brake shoe. The actuators 16 illustrated are of the pneumatic type, although it is to be understood that the actuators 16 may be of any desired type, including hydraulic, electric, vacuum, etc.

Figure 2:
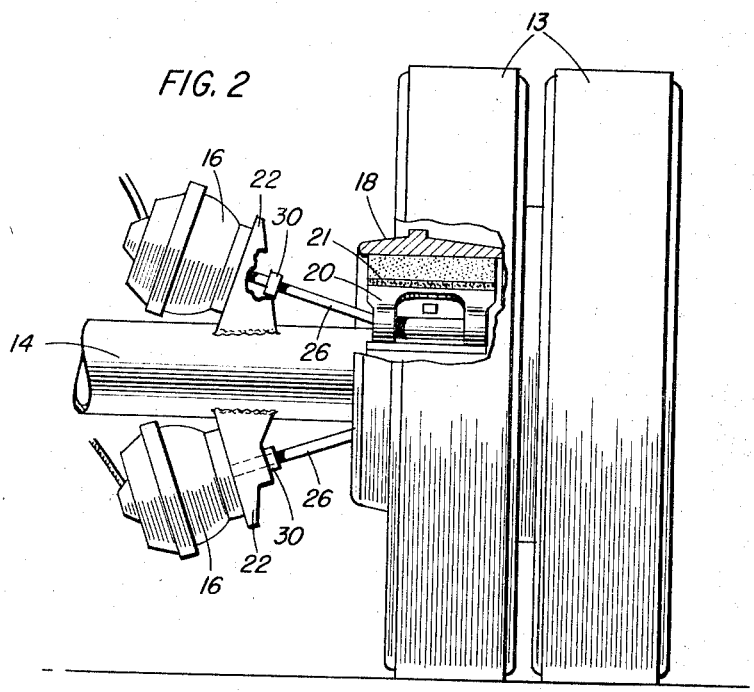
FIGURE 2 is an enlarged rear elevational view of one of the wheel assemblies of FIGURE 1, with a portion of one of the wheels being broken away and shown in section, with the section being taken substantially along the line 2—2 of FIGURE 1 and also showing two brake actuators mounted thereon.

Referring now to FIGURE 2, it will be seen that the wheel assembly 12 includes an axle housing 14 which includes a conventional spindle upon which there is rotatably mounted a conventional hub to which a rotatable brake drum 18 is secured. It is to be understood that the hub, the spindle, the brake drum and the vehicle wheels 13 will be of a generally conventional construction and may be of the general configuration such as that shown in U.S. Patent No. 3,135,363, issued June 2, 1964.

A vehicle braking mechanism of this type generally includes a plurality of brake shoes 20 and a separate fluid pressure operated actuator 16 for each of the brake shoes 20. Each actuator 16 is secured to the axle housing 14 by means of a mounting bracket 22 which is secured to the axle housing 14 by suitable means, such as welding, at 24.

The bracket 22 is of a U-shaped configuration and the upstanding edges 23 of the bracket toward the brake drum 18 are essentially perpendicular to the actuator link 26 for reasons which will become clear.

The actuator 16 is operatively connected to the internal braking mechanism by a linearly movable link 26, and it may be seen through the broken away portion of the bracket 22 (see FIGURE 2, for example) that the movable link 26 has an enlarged ring or collar 30 locked in place at a predetermined position on the link 26 which cooperates with a brake clearance adjusting means, which will be described in detail later, to limit the travel of the link 26 into full "brake-off" position.

The collar 30 on each actuator link 26 of the braking system is preferably positioned at predetermined point with regard to a fixed portion of the actuator, such as the actuator mounting bracket, so that all the actuator links 26 in a given system will come to rest in the full brake-off position with their respective collars 30 in the same relative position.

For the purpose of better explaining the instant method and means of adjusting the brake shoe clearance a braking system such as that embodied in my copending application Serial No. 370,155, filed May 26, 1964, for "Braking Mechanism" is shown for illustrative purposes only in FIGURES 3-6.

In FIGURES 3 and 4, a braking mechanism, of the type indicated which is in need of adjustment and equalization with regard to the other brake shoes comprising the vehicle braking mechanism, is shown. The movable links 26 of the actuators 16 are operatively connected to their respective bellcranks 32 which are partially shown. The bellcranks 32 are operatively connected to their respective brake shoes 20 through an intermediate internal adjusting means indicated generally at 34 which includes an external operable adjusting bolt 36 which is threaded and cooperates to move a sliding wedge to effectively vary the length of the connection 33 between the bellcrank 32 and the brake shoe 20. The threaded bolt 36 may therefore be rotated to adjust the clearance of the respective brake shoes.

In order to accomplish the accurate adjustment of the brake shoes without necessitating the dismantling of the brake system itself, I have invented a novel method and means to adjust the clearance of the brake linings 21; see FIGURE 2, for example.

As best seen in FIGURE 10, the fluid pressure operated actuator 16 is shown mounted on the axle housing 14 by means of the mounting bracket 22 which shows the actuator link 26 and the collar 30 in the brake off position. Application of pressure to the actuator 16, such as would be the case in applying the vehicle brakes, will cause the link 26 and its integral collar 30 to move in the direction and to position shown in broken lines. At this point, a brake shoe clearance adjusting shim 40 having a hook-shaped portion 42 is hooked over the link 26 between the fixed abutment edge 23 of the bracket 22 and the movable abutment collar 30. The brakes are then released and the link 26 moves toward off position as shown in FIGURE 11 by virtue of the brake return springs or the like, but is stopped from retracting into the full off position as shown in FIGURE 10 by the interposed clearance adjusting shim 40, thus coming to rest in the position shown in FIGURE 11.

Referring again to FIGURE 3, the internal brake mechanism is shown in the position it would assume with the actuator mechanism in the position shown in FIGURE 11. It may be seen that with the shim 40 in place on the link 26, as shown in FIGURE 11, that the brake lining 21 is in an initial unadjusted position which is not properly oriented relative to the drum 18, i.e., the desired final clearance from the drum 18.

With the shim 40 in place as shown in FIGURE 11, the brake shoe adjusting bolt 36 is rotated to bring the brake lining 21 into contact with the inner periphery of the brake drum 18 as shown in FIGURE 5. At this point, the shim 40 is removed from the actuator link 26 thus permitting the link 26 to move into the full off position shown in FIGURE 10, under the influence of the brake shoe return springs, etc., thereby simultaneously allowing the brake lining 21 to move into the final adjusted clearance position as shown in FIGURE 6. If desired, the brakes can be applied, i.e., air directed to actuator 16, to facilitate removal of shims 40.

FIGURE 15 illustrates another embodiment of a shim 41 which may be utilized to adjust brakes by the instant method. It is important that whatever form the shim may take, it must be exactly the same dimensionally as each and every other shim in the same set used to adjust the various brake shoes in any given braking system.

Referring now to FIGURE 7, an actuator 50 of the vacuum operated type is shown with its associated linearly movable link 52 in the brake on position. The actuator mounting bracket 54 is broken away to show the collar 53 on the link 52 in contact with the rear wall of the bracket 54. The bracket 54 has two longitudinally disposed rectangular fixed abutment slots 55, see FIGURE 9, which are transversely aligned on the upstanding portions of the bracket 54. The slots 55 may be of any configuration which generally corresponds to the cross-sectional configuration of the adjusting shim used. The slots 55 are positioned so as to be in perpendicular relation to the actuator link 52.

Figure 13:
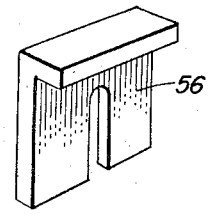
FIGURE 13 is an enlarged perspective of the brake shoe clearance adjusting shim shown in FIGURES 8 and 9.

With the vacuum actuator 50 in the on position as shown in FIGURE 7, an adjusting shim 56 as seen in FIGURE 13 is inserted into the slots 55 as shown in FIGURE 8. The brakes are released and the link 52 moves in the direction of the arrow shown in FIGURE 9. The collar 53 comes into contact with the shim 56, thus preventing the link 52 from moving into the full off position. At this point, the brake linings 21 are adjusted into contact with the brake drum 18. The shim 56 is then removed, thus permitting the link and its associated brake shoe to move away from the brake drum thus establishing the final brake lining clearance. The brakes can be applied, i.e., vacuum directed to actuator 50, to facilitate removal of shims 56.

Several "reverse methods" are available with respect to the typical structure of FIGURES 7–9 or FIGURES 10–12.

Referring to FIGURES 7–9, for example, and energizing the actuator by means of air pressure, FIGURE 7 would illustrate the brake off position, i.e., the abutment element 53 is in the retracted position. To prevent the brake shoe linings from fully engaging the inner surface of the brake drum, the shim element 56 is inserted in the slots 55. The actuator is activated and the brakes are applied so the force transmitting rod 52 moves toward the right as seen in FIGURE 8. The shims 56 prevent the brake shoes from being urged into engagement with the brake drum. The adjusting bolt 36 is operated to adjust the shoes into contact with the brake drum, the activator is deactivated, i.e., parts return to the position of FIGURE 7, the brake shoes will then have the proper clearance.

Referring to FIGURES 10–12, and assuming the actuator is vacuum actuated and is of the "pull type," the abutment 30 will be disposed in spaced relation from the abutment edges 23 during the brake off condition, i.e., the phantom line position shown in FIGURE 10. Before the actuator 16 is activated, the shim 40 is interpositioned between the abutment 30 and edge 23 and the actuator is activated, i.e., the brakes are applied. The abutment shim 40 will prevent the brake shoes from engaging the brake drum due to the interposed shim. The brake shoes are then adjusted to contact the brake drum by any suitable adjustment means. The actuator is then deactivated, i.e., the brakes are released. The shim 40 is removed, and the brake shoes will have the proper adjusted clearance.

In practice, my method of accurately adjusting the brake lining clearance involves providing a means such as a fixed and a movable abutment which cooperate with a shim to prevent the brake actuator linkage from moving into the full off position by an amount which is proportionate or equal to the final brake lining clearance desired, and adjusting the brake shoe lining into contact with the brake drum, or rotating portion of the wheel assembly, and removing the shim, thus allowing the brake shoe lining to retract from the brake drum, thus establishing a final clearance which is directly proportional to the adjusting shim used. It will therefore be readily seen that each and every brake shoe comprising a braking system may be accurately and positively set at the same clearance as all the other brake shoes in the system.

The adjustments of the brake-shoe-to-drum clearance on systems using conventional camshaft type brake mechanisms and where a single actuator is used to actuate two brake shoes in a single drum, are equally susceptible for adjustment as the typical systems heretofore disclosed.

The actuators, regardless of how they are operated, i.e., by means of a vacuum-atmosphere differential or by means of positive air pressure, or by mechanical means, all are considered to be adaptable to be adjusted by means of the novel system. The novel system, heretofore disclosed, permits all of the brake shoes of a braking system to be adjusted to the same brake-shoe-to-drum clearance regardless of differences of wear on the brake linings of the different brake shoes and/or difference in the thickness of brake linings due to manufacturing and/or installation.

From the foregoing, it will be apparent that there has been provided a novel method and means for accurately adjusting vehicle brakes. Although only preferred means have been illustrated and described, it is to be understood that variations may be made in the structure of the means without departing from the spirit of the invention, as defined in the appended claims.

I claim:

1. A method of adjusting vehicle brake lining clearance with respect to the brake drum, which includes the steps of: applying the vehicle brakes, interposing a brake-lining-clearance-adjusting gauge means to prevent the brakes from moving into the full off position when released, releasing brakes, adjusting the brake linings into contact with the drum, and removing said brake-lining-clearance-adjusting gauge means to allow said brake linings to move into the full off position thereby establishing the desired clearance of said brake lining from said brake drum by a single manual adjustment.

2. A method of adjusting vehicle brake mechanisms which include at least one externally mounted, remotely controlled brake actuator connected by an actuator link to operate a brake shoe of the braking system which comprises the steps of: providing each actuator with a fixed abutment means substantially in alignment with its associated actuator link, providing each actuator link with an abutment means fixed at a predetermined point on said actuator link spaced from said first mentioned fixed abutment means, applying the vehicle brakes to move said actuator link and its integral abutment means into the brake-on position, interposing a brake-linging-adjusting-gauge means on said link intermediately of said fixed and said movable abutment means, releasing the brake actuator to permit it to return to a normal off condition and move the actuator link to confine the brake-lining-ad-justing-gauge means in abutting relationship between the fixed and movable abutment means thereby preventing the actuator link from traveling into the full off position, adjusting the brake shoe to bring the brake lining into contact with the brake drum, removing the brake-lining-clearance-adjusting-gauge to allow the actuator link to move into the full off position thereby establishing the desired brake lining clearance from the brake drum by a single manual adjustment.

3. In a vehicle brake shoe adjusting system including a brake-shoe actuator, a brake drum, at least one brake shoe mounted on said drum and normally having an adjustable brake-shoe-to-drum clearance with respect to said drum, and a break-shoe actuator linkage operatively connected between said brake-shoe actuator and said brake shoe, the improvement wherein said actuator has a fixed abutment, said linkage has an integral abutment movable therewith in a path of travel relative to and in intersecting relation with respect to said fixed abutment on said actuator, and a brake-shoe-to-drum clearance gauge having a shim gauge portion removably interpositionable between said abutments for preventing said brake shoe from returning to a normal off position when said shoe is adjusted into contact with said drum and subsequently establishing the normal brake-shoe-to-drum clearance when said shim gauge portion is removed from between said abutments.

4. The method of adjusting brake-shoe-to-drum clearances in a braking system including a brake-shoe actuator, a brake drum having a braking surface, at least one brake shoe mounted in said brake drum for engagement with the braking surface of said drum, said brake shoe having a normal brake-shoe-to-drum clearance with respect to said drum during brake off condition, and force transmitting means operatively connected between said brake-shoe actuator and said brake shoe for urging said brake shoe into braking engagement with said braking surface, said force transmitting means having abutment means fixed thereon and having relative movement with respect to another fixed abutment means and a predetermined spaced relation existing between said abutment means during a brake off condition comprising the steps of:

orienting a clearance gauge having a thickness corresponding to the brake-shoe to drum clearance between said abutment means and permitting said force transmitting means to return, during a brake off condition, to a position less than a normal retracted position;

adjusting the brake-shoe into flush engagement with the braking surface of said brake drum during the retracted or brake off condition; and removing said clearance gauge between said abutment means and permitting said brake shoe to attain a break-shoe-to-drum clearance determined by said thickness gauge when the system is in a brake off condition.

5. The method of adjusting brake-shoe-to-drum clearances in a braking system including a brake-shoe actuator, a brake drum having a braking surface, at least one brake shoe mounted in said brake drum for engagement with the braking surface of said drum, said brake shoe having a normal brake-shoe-to-drum clearance with respect to said drum during brake off condition, and force transmitting means operatively connected between said brake-shoe actuator and said brake shoe for urging said brake shoe into braking engagement with said braking surface, said force transmitting means having abutment means fixed thereon and having relative movement with respect to another fixed abutment means and a predetermined spaced relation existing between said abutment means during a brake off condition comprising the steps of:

orienting a clearance gauge having a thickness corresponding to the brake-shoe-to-drum clearance between said abutment means;

activating the brake-shoe actuator;

adjusting the brake-shoe into flush engagement with the braking surface of said brake drum during actuation of the actuator; and deactivating said actuator and removing said clearance gauge from between said abutment means and permitting said brake shoe to attain a brake-shoe-to- drum clearance determined by said thickness gauge when the system is in a brake off condition.

References Cited

UNITED STATES PATENTS 2,045,882   6/1936   Stromgren _____ 188—79.5

DUANE A. REGER, *Primary Examiner.*